(12) United States Patent
Reichensperger et al.

(10) Patent No.: US 10,974,815 B2
(45) Date of Patent: Apr. 13, 2021

(54) MULTIROTOR AIRCRAFT WITH A THRUST PRODUCING UNIT THAT COMPRISES AN AERODYNAMICALLY OPTIMIZED SHROUDING

(71) Applicant: AIRBUS HELICOPTERS DEUTSCHLAND GMBH, Donauworth (DE)

(72) Inventors: Christian Reichensperger, Oberndorf am Lech (DE); Uwe Kiesewetter, Rain am lech (DE); Petr Schejbal, Munich (DE); Lukasz Paluszek, Augsburg (DE); Klaus Kicker, Hilgertshausen-Tandem (DE); Martin Blacha, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 16/438,548

(22) Filed: Jun. 12, 2019

(65) Prior Publication Data

US 2020/0062377 A1 Feb. 27, 2020

(30) Foreign Application Priority Data

Jun. 13, 2018 (EP) .................................... 18400014

(51) Int. Cl.
*B64C 11/00* (2006.01)
*B64C 11/46* (2006.01)

(52) U.S. Cl.
CPC ............ *B64C 11/001* (2013.01); *B64C 11/46* (2013.01)

(58) Field of Classification Search
CPC .............................. B64C 11/001; B64C 11/46
See application file for complete search history.

(56) References Cited

U.S. PATENT DOCUMENTS 3,061,243 A 10/1962 Simon
3,262,657 A 7/1966 Anker-Holth
(Continued)

FOREIGN PATENT DOCUMENTS

CN 201306711 Y 9/2009
CN 202728571 U 2/2013
(Continued)

OTHER PUBLICATIONS

Extended European Search Report for European Application No. EP 18400014.9, Completed by the European Patent Office, dated Dec. 7, 2018, 8 pages.
(Continued)

*Primary Examiner* — Justin M Benedik
(74) *Attorney, Agent, or Firm* — Brooks Kushman P.C.

(57) ABSTRACT

A multirotor aircraft with an airframe that extends in a longitudinal direction, and with at least one thrust producing unit for producing thrust in a predetermined thrust direction, wherein the at least one thrust producing unit comprises a shrouding that is associated with at least one rotor assembly comprising at least one electrical engine, wherein the shrouding defines a cylindrical air duct that is axially delimited by an air inlet region and an air outlet region, and wherein a carrier beam is at least mounted at a leading edge region of the cylindrical air duct to the shrouding such that the carrier beam is arranged inside of the cylindrical air duct and oriented at least essentially in parallel to the longitudinal direction, the at least one electrical engine being mounted to the carrier beam.

20 Claims, 7 Drawing Sheets

(56) References Cited

U.S. PATENT DOCUMENTS

| | | | |
|---|---|---|---|
| 6,568,630 B2 | 5/2003 | Yoeli | |
| D493,411 S * | 7/2004 | Fong | D12/319 |
| 7,857,253 B2 | 12/2010 | Yoeli | |
| 7,946,528 B2 | 5/2011 | Yoeli | |
| D678,169 S | 3/2013 | Kennelly et al. | |
| 8,393,564 B2 | 4/2013 | Kroo | |
| 8,733,690 B2 | 5/2014 | Bevirt et al. | |
| 10,131,426 B2 | 11/2018 | Judas et al. | |
| 2007/0034738 A1 | 2/2007 | Sanders, Jr. et al. | |
| 2012/0012692 A1* | 1/2012 | Kroo | B64C 39/08 |
| | | | 244/6 |
| 2013/0118856 A1 | 5/2013 | Long | |
| 2015/0127209 A1 | 5/2015 | Al-Garni et al. | |
| 2016/0009387 A1* | 1/2016 | Kummer | B64C 29/0066 |
| | | | 244/6 |
| 2016/0347443 A1* | 12/2016 | Lee | B64C 27/08 |
| 2017/0240274 A1 | 8/2017 | Regev | |
| 2018/0244367 A1* | 8/2018 | Kiesewetter | B64C 27/20 |

FOREIGN PATENT DOCUMENTS

| | | |
|---|---|---|
| DE | 102005022706 A1 | 11/2006 |
| DE | 102013108207 A1 | 2/2015 |
| EP | 2234883 B1 | 10/2010 |
| EP | 2551190 A1 | 1/2013 |
| EP | 2551193 A1 | 1/2013 |
| EP | 2551198 A1 | 1/2013 |
| EP | 3184425 A1 | 6/2017 |
| GB | 905911 A | 9/1962 |
| KR | 101451646 B1 | 10/2014 |
| WO | 2015028627 A1 | 3/2015 |

OTHER PUBLICATIONS

Extended European Search Report dated Jun. 21, 2019, Application No. 19156955.7-1010, Applicant Airbus Helicopters Deutschland GMBH, 7 Pages.

* cited by examiner

MULTIROTOR AIRCRAFT WITH A THRUST PRODUCING UNIT THAT COMPRISES AN AERODYNAMICALLY OPTIMIZED SHROUDING

CROSS-REFERENCE TO RELATED APPLICATIONS

This application claims priority to European patent application No. EP 18400014.9 filed on Jun. 13, 2018, the disclosure of which is incorporated in its entirety by reference herein.

BACKGROUND OF THE INVENTION

(1) Field of the Invention

The invention is related to a multirotor aircraft with an airframe that extends in a longitudinal direction, and with at least one thrust producing unit for producing thrust in a predetermined thrust direction, wherein the at least one thrust producing unit comprises a shrouding that is associated with at least one rotor assembly.

(2) Description of Related Art

Various conventional multirotor aircrafts are known, e.g. from the documents EP 2 551 190 A1, EP 2 551 193 A1, EP 2 551 198 A1, EP 2 234 883 A1, WO 2015/028627 A1, U.S. Pat. Nos. 3,262,657, D678169 S, 6,568,630 B2, 8,393,564 B2, 7,857,253 B2, 7,946,528 B2, 8,733,690 B2, US 2007/0034738 A1, US 2013/0118856 A1, DE 10 2013 108 207 A1, GB 905 911, CN 202728571 U and CN 201306711 U. Other multirotor aircrafts are also known from the state of the art, such as e.g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e.g. described in the documents US 2015/0127209 A1, DE 10 2005 022 706A1 and KR 101 451 646 B1. Furthermore, multirotor aircraft studies and fictions also exist, such as e.g. the crossover-mobility vehicle Pop.Up Next that was developed by Airbus, Italdesign and Audi, the autonomous aerial vehicle Ehang 184 that was developed by Bejing Yi-Hang Creation Science & Technology Co. Ltd., the multicopter Volocopter VC200 that was developed by e-Volo GmbH, the vertically caking off and landing (VTOL) aircraft S2 that was developed by Joby Aviation Inc., the skyflyer SF MK II that was developed by Skyflyer Technology GmbH, and the multicopter shown in the Avatar movie.

Each one of these conventional multirotor aircrafts is equipped with two or more thrust producing units that are provided for producing thrust in a predetermined thrust direction during operation of the multirotor aircraft. In general, each thrust producing unit includes one or more rotors or propellers and is, usually, designed for specific flight conditions. By way of example, a thrust producing unit that is designed as an airplane propeller operates at its optimum in cruise conditions, whereas a thrust producing unit that is designed as propeller of a compound helicopter is essentially adapted for hover or forward flight conditions, while a thrust producing unit that implements e.g. a so-called Fenestron® tail rotor is particularly designed for hover conditions.

In all of these examples, the respective thrust producing unit is optimized for operation in axial air flow conditions, i.e. in an air flow direction that is oriented at least approximately along a rotor axis resp. rotation axis of the given one or more rotors or propellers and, therefore, referred to as an axial air flow direction. If, however, the respective thrust producing unit is operated in transversal air flow conditions, i.e. in an air flow direction that is oriented transverse to the rotor axis of the given one or more rotors or propellers and, therefore, referred to as a non-axial air flow direction, a respective efficiency of the thrust producing unit usually decreases considerably.

By way of example, in the case of operation of a multirotor aircraft with two or more thrust producing units, the thrust producing units will be subjected to axial air flow conditions e.g. during a vertical take-off phase. Subsequently, respective thrust vectors generated by the thrust producing units can be inclined in a predetermined direction, e.g. by rotating the thrust producing units accordingly, so that the multirotor aircraft gains velocity and leaves a previous hovering condition such that is converts to forward flight, wherein the thrust producing units are subjected to transversal air flow conditions. However, in the transversal air flow conditions, respective ducts or shrouds, which are beneficial in axial air flow conditions, are penalizing by generating a comparatively large amount of drag. In other words, an underlying advantage provided by the ducts or shrouds in hovering turns out to be a disadvantage in forward flight, which increases with increasing a respective advancing speed of the multirotor aircraft in forward flight.

Nevertheless, it should be noted that in axial air flow conditions a ducted rotor or propeller, i.e. a rotor or propeller that is provided with a duct or shroud, is approximately 25% to 50% more efficient than an equivalent isolated or non-ducted rotor or propeller, i.e. a rotor or propeller without duct or shroud, which has comparable global dimensions, i.e. diameter and mean chord. In other words, the presence of a duct or shroud increases a respectively produced thrust of a given thrust producing unit at constant required power. Therefore, conventional thrust producing units are frequently provided with one or more rotors or propellers that is/are completely enclosed in an associated duct or shroud. This classical configuration uses a respective rotor or propeller induced velocity to generate thrust also from the duct or shroud.

In general, a duct or shroud is defined by an enclosed, annular surface that is arranged around a rotor or propeller in order to improve respective aerodynamics and performances of the rotor or propeller. A conventional duct or shroud is usually not rotatable, i.e. cannot be inclined, and has a height that is selected such that a given rotor or propeller is fully enclosed therein.

However, as the duct or shroud must have a certain height or length in order to enclose an associated rotor or propeller and is, thus, comparatively large in size, the duct or shroud increases an overall weight of a respective multirotor aircraft due to its size, and further increases aerodynamic drag e.g. during forward flight, i.e. in transversal air flow conditions, as the duct or shroud cannot be inclined for adjustment of an underlying thrust vector direction. Increase of the aerodynamic drag is particularly critical for multirotor aircrafts that are provided with electrically powered engines, as the aerodynamic drag must be considered when sizing a respectively required electrical drive system and, further, it directly impacts an achievable flight time.

In other words, although generation of additional thrust is an important advantage resulting from the use of the duct or shroud, the duct or shroud is, however, strongly penalizing in forward flight, i.e. in transversal air flow conditions, due to additional aerodynamic drag generated by the duct or shroud. The additional aerodynamic drag is directly proportional to a respective frontal area that is defined by a product of height and width of the duct or shroud.

Therefore, considerable efforts are made to improve design and, thus, underlying aerodynamics and performances of conventional ducts or shrouds. Usually, such efforts merely concentrate on the ducts or shrouds as such, while associated structural supports that are required for either attaching required engines within the ducts or shrouds, or for mounting the ducts or shrouds to a respective airframe of a multirotor aircraft, are not taken into consideration. However, these associated structural supports and the required engines cause usually up to 70% of an overall aerodynamic drag of the respective multirotor aircraft, while its airframe, which occupies a significantly larger area, barely contributes to this overall aerodynamic drag.

Furthermore, other design requirements for ducts or shrouds must also be taken into consideration in addition to the aerodynamic drag. In particular, an underlying aerodynamic lift and resulting static loads, an accuracy of shape, underlying Eigenmodes resp. dynamic stiffness, noise generation, as well as engine and structural integration must be considered.

More particularly, with respect to aerodynamic lift and resulting static loads, respective ducts or shrouds may be configured such that they are suitable to create an important amount of lift on their respective leading edge regions. However, such huge amount of lift induces significant bending moments at the leading edge regions. Such significant bending moments, however, lead to significant deformations at the leading edge regions which are in conflict with an underlying requirement of close tolerance between the ducts or shrouds and a rotor or propeller that is enclosed therein. In order to avoid such significant deformations, a given duct or shroud can be covered by a respective shear material having a suitable thickness, or by including additional stator vanes within the ducts or shrouds. However, such design measurements are contrary to a required lightweight design or reduction of noise generation.

With respect to the accuracy of shape, an underlying design must consider that ducts or shrouds are generally close tolerance parts. More specifically, the smaller underlying tolerances are designed, the better are obtainable beneficial effects on air flow and performance of a given duct or shroud. A typical size of a realized gap between respective rotor blades of a rotor or propeller that is enclosed in the duct or shroud is about 4 mm between the blade tips and the duct or shroud. In general, the accuracy of shape is ensured by associated stator vanes. However, it is well-known that the number of provided stator vanes is detrimental on the aerodynamic drag and noise generation of the multirotor aircraft.

With respect to the Eigenmodes and dynamic stiffness, it must be considered that the above-mentioned structural supports that attach the ducts or shrouds to associated airframes of multirotor aircrafts exhibit an unfavorable vibrational behavior due to a respectively underlying length of the structural supports that are usually supported on only one side of the ducts or shrouds. This, however, represents significant drawbacks with respect to weight, flight comfort and fatigue loads of respective multirotor aircrafts.

With respect to noise generation, it must be taken into consideration that this is an important criterion if a respective multirotor aircraft is intended for use in transportation of passengers, e.g. in use as an air taxi. In other words, for such air taxis respective authorities will request particular configurations with reduced noise generation. In this respect, it must be noted that the structural supports required for attaching the ducts or shrouds to a respective airframe of a multirotor aircraft and/or for attaching required engines within the ducts or shrouds are by definition crossing a generated downwash of associated rotors or propellers and are, hence, a source of noise. This is particularly critical if these structural supports extend radially to a rotor hub of the engines.

Finally, with respect to the engine and structural integration, it must be noted that integration of the engine is always complicated as many secondary requirements, such as accessibility and maintainability, must be ensured. On the other hand, structural and fatigue strength, stiffness, aerodynamic drag and the possibility of cooling integration must be guaranteed. However, in conventional designs integration of a cooling, such as e.g. a heat exchanger, is generally very complicated.

The document US 2012/0012692 A1 describes a multirotor aircraft having a plurality of thrust producing units. On each side of this multirotor aircraft, a thrust producing unit with four vertical lift rotors is arranged within a protective shroud, which is also referred to as a fence. Each vertical lift rotor is mounted to a propulsion boom that is arranged at a central position of the shroud and oriented at least essentially in parallel to a longitudinal extension of the multirotor aircraft. More specifically, a single propulsion boom is mounted inside of each shroud and supports all four vertical lift rotors that are associated therewith. Furthermore, each one of the propulsion booms is attached to an airframe of the multirotor aircraft by means of three associated struts, which also mount the shroud to the airframe. The vertical lift rotors may be provided with associated electrical engines. However, in this multirotor aircraft the vertical lift rotors are merely intended for lifting the aircraft, but they are not intended to contribute to forward flight and, as such, they are not required to operate in transversal air flow conditions.

BRIEF SUMMARY OF THE INVENTION

It is, therefore, an object of the present invention to provide a new multirotor aircraft that exhibits improved aerodynamics and performances in transversal air flow conditions.

This object is solved by a multirotor aircraft comprising the features of claim 1. More specifically, according to the present invention a multirotor aircraft with an airframe that extends in a longitudinal direction, and with at least one thrust producing unit for producing thrust in a predetermined thrust direction, is provided. The at least one thrust producing unit comprises a shrouding that is associated with at least one rotor assembly comprising at least one electrical engine. The shrouding defines a cylindrical air duct that is axially delimited by an air inlet region and an air outlet region. A carrier beam is at least mounted at a leading edge region of the cylindrical air duct to the shrouding such that the carrier beam is arranged inside of the cylindrical air duct and oriented at least essentially in parallel to the longitudinal direction. The at least one electrical engine is mounted to the carrier beam.

It should be noted that the term "shrouding" should be understood as encompassing simultaneously the terms "duct" and "shroud". In other words, in the context of the present invention, the term "shrouding" refers interchangeably to a duct or a shroud.

Advantageously, the at least one thrust producing unit of the inventive multirotor aircraft is implemented as a shrouded multiple rotor assembly configuration that leads to a significantly reduced aerodynamic drag in transversal air flow conditions, e.g. in forward flight of the inventive multirotor aircraft. This significantly reduced aerodynamic drag results at least partially from a preferred design of the shrouding itself, in particular from an underlying undulated geometry of the air inlet region in circumferential direction of the cylindrical air duct.

More specifically, the shrouding of the at least one thrust producing unit and all associated elements are preferably axially non-symmetric, i.e. non-symmetric over the azimuth ψ of the shrouding. In other words, the shrouding is designed on the basis of a variable factor with respect to all associated elements, i.e.:

Height vs. Azimuth ψ,
Air inlet region radius vs. Azimuth ψ,
Air outlet region radius vs. Azimuth ψ, and/or
Arrangement of additional lifting surfaces vs. Azimuth ψ.

In particular, a variable height of the shrouding enables significant advantages in the trade-off between vertical take-off and hovering, wherein an underlying efficiency increases with an increase of the height of the shrouding, and forward flight, wherein an underlying drag decreases with a decrease of the height of the shrouding, as this reduces a respective drag area of the shrouding.

Preferably, the shrouding is used as an additional lifting device during hover and forward flight cases of the inventive multirotor aircraft and, thus, beneficially allows reduction of a respective power consumption of the inventive multirotor aircraft. Furthermore, the shrouding may provide for a shielding effect with respect to a rotor assembly that is accommodated therein and, thus, advantageously allows to reduce a respective rotor noise footprint on ground.

According to one aspect, the at least one thrust producing unit can be provided with a foreign object protection, e.g. by being enclosed by a grid, in order to protect a rotor assembly that is accommodated therein from foreign objects. Such a foreign object protection beneficially prevents misuse and accidents by and of individuals, e.g. by preventing them from getting their hands caught in rotating parts, thereby leading to an increased operational safety level of the at least one thrust producing unit of the inventive multirotor aircraft.

Advantageously, by providing the at least one thrust producing unit of the inventive multirotor aircraft with the at least two rotor assemblies that define different rotor planes, the rotor assemblies can be positioned above each other and rotated in a counter rotating manner, leading to a thrust producing unit that provides for an increased safety level and that allows reduction of the overall dimensions of the inventive multirotor aircraft, resulting in a comparatively small aircraft, since the two or more rotor planes can be combined in a single thrust producing unit.

According to one aspect, the shrouding of the at least one thrust producing unit of the inventive multirotor aircraft with the cylindrical air duct relieves the electrical engine and beneficially creates additional lift. This is important in order to increase an underlying efficiency of the inventive multirotor aircraft and its electrical engine on a global level.

An important aspect of the present invention consists in a suitable structural integration of the shrouding and, thus, the at least one thrust producing unit into the inventive multirotor aircraft. More specifically, the at least one thrust producing unit preferably comprises a load carrying framework that comprises the carrier beam which is used for mounting of the at least one electrical engine. This carrier beam advantageously transfers loads from the at least one electrical engine to associated forward and aft beams of the at least one thrust producing unit and is stiffening the cylindrical air duct resp. the shrouding in longitudinal direction of the airframe of the multirotor aircraft in order to prevent ovalisation in operation by supporting the cylindrical air duct at its highest loaded locations. Furthermore, due to its longitudinal orientation in parallel to a longitudinal extension of the airframe of the inventive multirotor aircraft, the carrier beam merely contributes in a completely neglectable manner to an overall aerodynamic drag of the inventive multirotor aircraft. In particular, as it is not arranged radially with respect to rotor blades of a given rotor assembly, it exhibits significant advantages concerning its contribution to noise emission.

Furthermore, the forward and aft beams that are connected to the carrier beam, preferably attach the shrouding of the at least one thrust producing unit to the airframe of the inventive multirotor aircraft. The forward and aft beams may be provided with continuous flanges in order to be as stiff as possible with respect to bending loads. Furthermore, if torsional loads must be taken into consideration and are important, closed profiles can be used for a respective support structure that is defined by the forward and aft beams, respectively their continuous flanges.

Preferably, the forward and aft beams are located outside of the cylindrical air duct. Thus, they can advantageously be shaped aerodynamically by any means without detrimental effect on the downwash of the at least one thrust producing unit. Preferably, the forward and aft beams are integrated into the shrouding of the at least one thrust producing unit.

According to one aspect, implementation of the at least one thrust producing unit with a shrouding as described above advantageously allows for integration of the electrical engine and cooling. More specifically, due to the longitudinally arranged carrier beam inside of the cylindrical air duct, the at least one electrical engine can be integrated eccentrically, i.e. sideward of the carrier beam. This allows the carrier beam to work as a continuous bending beam without any tapering and cross section variances. This has a significant advantage with respect to stiffness, stress, and fatigue. Furthermore, the carrier beam offers a large area which is also oriented along a transversal air flow direction and, thus, a large cooling area for the electrical engine is provided and available, which is, however, not contributing to the overall aerodynamic drag of the inventive multirotor aircraft.

Furthermore, the shrouding of the at least one thrust producing unit can be optimized with respect to aerodynamics and performance in that it can be designed in order to provide additional lift. In particular, a leading edge region of the shrouding can be designed for providing such additional lift.

According to one aspect, the carrier beam is arranged eccentrically inside of the cylindrical air duct and at least essentially coplanar to a cross section of the cylindrical air duct.

According to another aspect, the carrier beam is a cantilever.

According to still another aspect, the carrier beam is further mounted at a trailing edge region of the cylindrical air duct to the shrouding.

According to still a further aspect, the carrier beam is bar-shaped and extends from the leading edge region to the trailing edge region.

According to still another aspect, the shrouding comprises a forward beam and an aft beam which both connect the carrier beam to the airframe, the forward beam and the aft beam being arranged outside of the cylindrical air duct.

According to still another aspect, the forward beam comprises a forward flange, wherein the aft beam comprises an aft flange, the forward flange and the aft flange being attached to the airframe.

According to still another aspect, the forward beam and the forward flange are integrally formed, and the aft beam and the aft flange are likewise integrally formed. Preferably, the forward flange and the aft flange are integrally formed.

According to still another aspect, the cylindrical air duct is provided in closed perimeter configuration or in opened perimeter configuration. The shrouding is at least partly cut-off in the opened perimeter configuration at a trailing edge region of the cylindrical air duct over a predetermined opening angle.

According to still another aspect, the shrouding is provided with an additional lifting surface at the leading edge region of the cylindrical air duct.

According to still another aspect, the at least one electrical engine is eccentrically mounted to the carrier beam.

According to still another aspect, the air inlet region exhibits in circumferential direction of the cylindrical air duct an undulated geometry. The cylindrical air duct comprises in circumferential direction a leading edge region and a diametrically opposed trailing edge region, a board side lateral region and a diametrically opposed star board side lateral region, wherein the board side lateral region and the star board side lateral region are respectively arranged in the circumferential direction of the cylindrical air duct between the leading edge region and the trailing edge region. A height at the leading edge region is preferably smaller than a height at the board side lateral region and/or the star board side lateral region.

According to still another aspect, the cylindrical air duct exhibits a height defined between the air outlet region and the air inlet region in axial direction of the cylindrical air duct that varies in circumferential direction of the cylindrical air duct. The height that varies in the circumferential direction of the cylindrical air duct defines the undulated geometry of the air inlet region.

According to still another aspect, the height at the trailing edge region is smaller than a height at the board side lateral region and/or the star board side lateral region.

According to still another aspect, the height at the trailing edge region is smaller than the height at the leading edge region.

Advantageously, the shrouding of the at least one thrust producing unit of the inventive multirotor aircraft allows reducing respective overall dimensions of the inventive multirotor aircraft. Furthermore, individuals approaching the shrouded thrust producing unit are protected against injury. Moreover, foreign object damages of the thrust producing unit in operation, such as e.g. bird strike or wire strike, can securely and reliably be prevented. In addition, the overall operational safety of the inventive multirotor aircraft in case of air collisions can be improved.

Moreover, respective aerodynamics, acoustics and performances can be improved by reducing a respective rotor blade loading in operation, reducing an overall power consumption, reducing a respective noise emission and ameliorating functioning in hover and forward flight of the inventive multirotor aircraft. Furthermore, an underlying required diameter of the at least one thrust producing unit can be reduced. Additionally, lift of the inventive multirotor aircraft is improved by the shrouding itself, potentially reducing the overall, power required by the inventive multirotor aircraft.

It should be noted that although the inventive aircraft is described above with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing unit of the multirotor aircraft according to the present invention. Consequently, any reference to rotors or rotor structures in the present description should likewise be understood as a reference to propellers and propeller structures, so that the inventive multirotor aircraft can likewise be implemented as a multipropeller and/or multipropeller and -rotor aircraft.

In, other words, the present invention principally relates to a multiple thrust configuration with rotors/propellers that define rotor/propeller planes, which can be selected to be Positioned atop of each other individually, a shrouding for enclosing any rotating part of most one the rotors/propellers, at least one electrical engine which drives each rotor/propeller, wherein each engine can be segregated in order to increase a provided safety level, and wherein a logic connection preferably exists between battery and electrical engines, the logic connection, preferentially comprising a redundant design increasing the safety level in case of failure, and wherein preferably a battery redundancy layout with an appropriate safety level in case of failure is provided.

Advantageously, by providing the at least one thrust producing unit of the inventive multirotor aircraft as described above, the aerodynamic drag that is generated by the carrier beam that carries the at least one electrical engine of the rotor assembly can be eliminated almost completely. A respective aerodynamic drag which is still produced by the at least one electrical engine may advantageously be minimized, as installation of a smooth aerodynamic attachment may easily be integrated. Furthermore, the aerodynamic drag that is produced on the shrouding itself is beneficially supported at a respective location where its majority is created such that deformation and ovalisation of the cylindrical air duct may advantageously be prevented. Furthermore, the carrier beam's geometric shape is preferably adapted to associated static requirements, i.e. the carrier beam's bending around a global lateral resp. transversal axis, and results in implementing the carrier beam higher in vertical direction than wider in lateral resp. transversal direction. Consequently, the carrier beam's geometric shape is no longer impacting the aerodynamic behavior significantly.

Furthermore, it should be noted that the majority of lift is created at a respective leading edge region of the shrouding. Advantageously, a corresponding load is directly supported and occurs on this leading edge region. More specifically, due to a preferred duct design in the leading edge region in terms of design space, the inventive support structure exhibits enough inertia to take the loads without notable bending or torsional deformation. Consequently, the loads are directly supported without leading an underlying load path over a stator vane or an associated exterior carrier beam to the primary structure of the multirotor aircraft.

Moreover, in contrast to conventional stator vanes the support structure of the inventive multirotor aircraft is essentially provided outside of the cylindrical duct of each shrouding. Therefore, it may exhibit a drop-like aerodynamic shape that will not block an additional surface in the downwash area of the rotor or propeller which would, otherwise, lower a desired efficiency of the multirotor aircraft.

As already described above, locations where loads are occurring on and in the shrouding are directly supported and coupled via the carrier beam that is oriented according to aspects of the present invention with a very stiff load path. This ensures accuracy of shape without any further stator vanes, which would be detrimental for noise generation and aerodynamic drag. This is necessary to keep a required airgap between the cylindrical air duct and an associated rotor.

Advantageously, the carrier beam of the inventive multirotor aircraft, which is supported on its both axial sides, shows an improved vibrational behavior with respect to conventional single cantilever beam solutions. Both bending and torsional modes are significantly shifted upward, which is highly beneficial as higher Eigenmodes are usually less critical.

Furthermore, advantageously no additional stators are necessary. The at least one electrical engine is advantageously installed eccentrically to a carrier beam so that respective rotor blades do not cross the engine resp. carrier beam radially. These two measurements largely contribute to lower noise generation of the rotor.

Advantageously, the electrical engine can easily be integrated to the carrier beam with two suitable ribs. Access for maintenance and installation is, thus, guaranteed for at least 180° of the at least one electrical engine. This is not feasible with centrically mounted engines, as for these engines the beam would have to be dissolved to a framework structure in order to integrate the engine. This would, however, result to significant drawbacks concerning weight and stiffness and the access is blocked more or less 360° around the engine, which is not the case according to the present invention.

Finally, cooling integration is also highly beneficial. Respective heat exchangers can be placed along a given upper flange of the carrier beam. Due to an underlying flight attitude of the multirotor aircraft, this does only marginally increase a projected aerodynamic drag and is well covered by the airstream.

Advantageously, the inventive multirotor aircraft designed for transportation of passengers and is, in particular, suitable and adapted for being certificated for operation within urban areas. It is preferably easy to fly, has multiple redundancies, meets the safety demands of the authorities, is cost efficient in design and only creates comparatively low noise. Preferably, the inventive multirotor aircraft has a comparatively small rotor diameter with a light weight design and a fixed angle of incident and is nevertheless adapted for fulfilment of an emergency landing, although these rotor characteristics lead to a comparatively low inertia and a non-adjustable torque in operation.

According to one aspect, the inventive multirotor aircraft is capable of hovering and comprises a distributed propulsion system. It is further preferably designed with autorotation capability, which is necessary amongst, other requirements in order to meet authority regulations, such as e.g. FAR and EASA regulations, regarding safety failure modes that amount up to approximately $1*10^{-7}$ failures per flight hour for the entire multirotor aircraft. In the aeronautical sector, these safety levels are typically defined by the so-called Design Assurance Levels (DAL) A to D.

Preferably, the inventive multirotor aircraft fulfils the authorities' regulation safety level needed to transport passengers. This is preferentially achieved by a combination and correlation of:

at least two individual rotor assemblies per thrust producing unit,
a redundant, segregated battery layout,
a redundant power supply and harness layout,
a physical separation and segregation of an underlying power management,
redundant, segregated electrical engines, and
pitch control and/or RPM control of the rotor assemblies.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
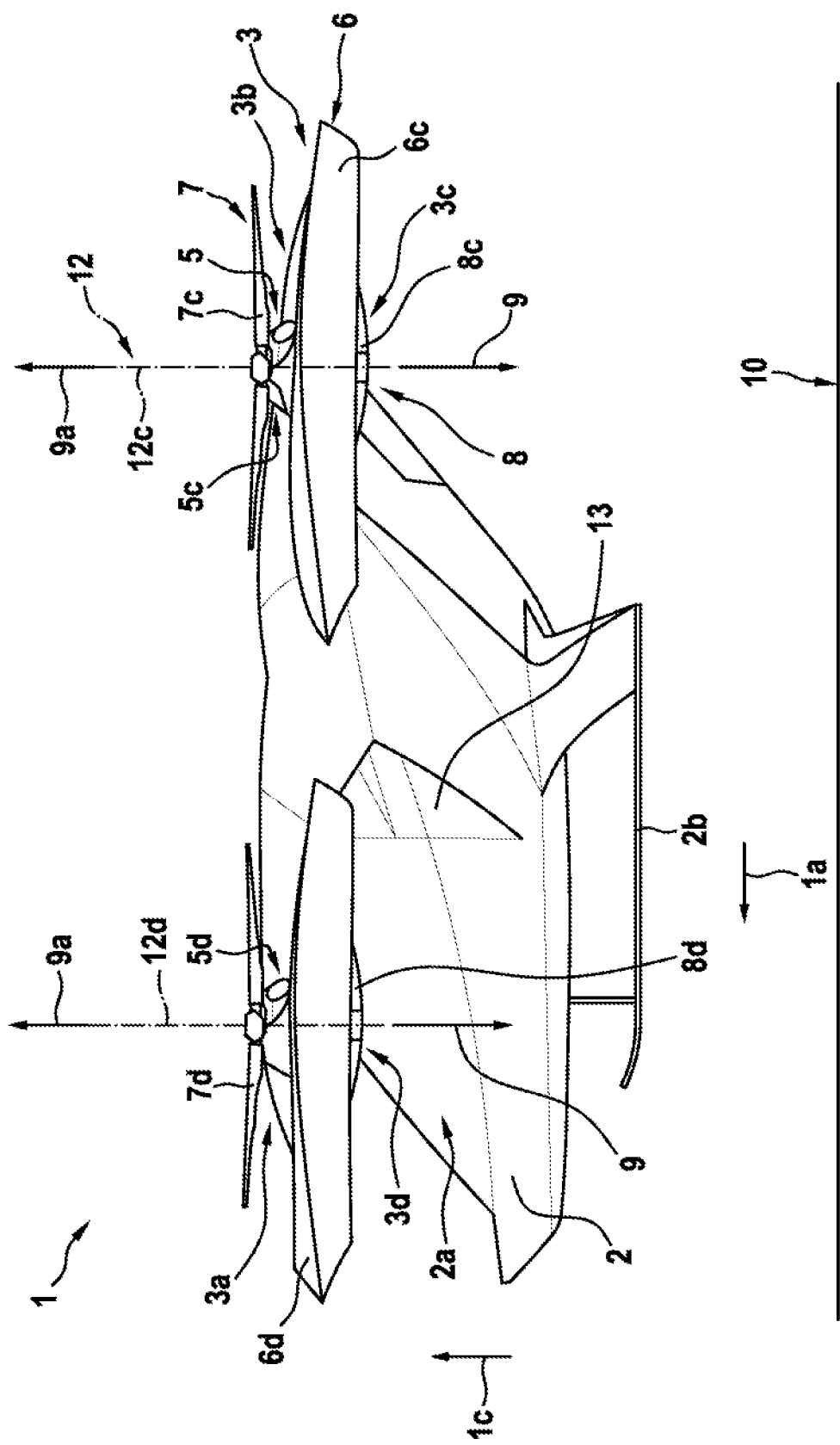
FIG. 1 shows a side view of a multirotor aircraft with a plurality of exemplary thrust producing units having shroudings according to one aspect of the present invention.

FIG. 1 shows a multirotor aircraft 1 with an aircraft airframe 2 according to the present invention. The aircraft airframe 2 defines a supporting structure that is also referred to hereinafter as the "fuselage" of the multirotor aircraft 1.

The fuselage 2 has an extension in longitudinal direction 1a, which is illustratively represented by an arrow 1a that also exemplarily indicates a forward flight direction of the multirotor aircraft 1, an extension in lateral direction (1b in FIG. 2, FIG. 3, FIG. 9, and FIG. 10), and an extension in vertical direction 1c. Preferentially, the fuselage 2 is connected to a suitable undercarriage 2b. Illustratively, the suitable undercarriage 2b is a skid-type landing gear. However, other suitable undercarriages 2b, such as e.g. wheel-type landing gears, are likewise contemplated.

Preferably, the fuselage 2 is provided with an outer shell 13 which defines an internal volume 2a that is at least adapted for transportation of passengers, so that the multirotor aircraft 1 as a whole is adapted for transportation of passengers. The internal volume 2a is preferably further adapted for accommodating operational and electrical equipment, such as e.g. an energy storage system that is required for operation of the multirotor aircraft 1.

It should be noted that exemplary configurations of the internal volume 2a that are suitable for transportation of passengers, but also for accommodation operational and electrical equipment, are readily available to the person skilled in the art and generally implemented to comply with applicable authority regulations and certification requirements regarding passenger transportation. Thus, as these configurations of the internal volume 2a as such are not part of the present invention, they are not described in detail for brevity and conciseness.

According to one aspect, the multirotor aircraft 1 comprises a plurality of thrust producing units 3. Preferably, the plurality of thrust producing units 3 comprises at least two and preferentially four thrust producing units 3a, 3b, 3c, 3d. The thrust producing units 3a, 3b, 3c, 3d are embodied for generating a thrust producing airstream in a direction that is indicated with an arrow 9 in operation, such that a thrust illustrated by a thrust vector 9a is generated, so that the multirotor aircraft 1 is able to hover in the air above a surface 10, as illustrated by way of example. By varying the direction of the thrust vector 9a, the multirotor aircraft 1 may perform forward, rearward or sideward flight.

The thrust producing units 3a, 3b, 3c, 3d are structurally connected to the fuselage 2, as described in detail below with reference to FIG. 2. Preferably, at least one of the thrust producing units 3a, 3b, 3c, 3d comprises an associated shrouding in order to improve underlying aerodynamics and to increase operational safety. By way of example, a shrouding 6c is associated with the thrust producing unit 3c and a shrouding 6d with the thrust producing unit 3d. The shroudings 6c, 6d illustratively define a plurality of shroudings 6 and can be made of a simple sheet metal. However, according to one aspect the shroudings 6c, 6d have a complex geometry, such as e.g. described below with reference to FIG. 4.

It should be noted that the thrust producing units 3a, 3b, 3c, 3d are all exemplarily arranged laterally with respect to the fuselage 2, i.e. on the left, or right side of the fuselage 2 seen in its longitudinal direction 1a. Accordingly, in FIG. 1 only the thrust producing units 3c, 3d are visible, while the thrust producing units 3a, 3b are masked by the fuselage 2. However, according to one aspect the thrust producing units 3a, 3b are embodied in an axially symmetrical manner with respect to the thrust producing units 3d, 3c, wherein a longitudinal center axis in the longitudinal direction 1a of the fuselage 2 defines the symmetry axis. Accordingly, only the thrust producing units 3c, 3d and their constituent elements are described in more detail hereinafter, while a more detailed description of the thrust producing units 1a, 1b is omitted for brevity and conciseness.

It should be noted that this exemplary arrangement is only described by way of example and not for limiting the present invention thereto. Instead, other arrangements are also possible and likewise contemplated. For instance, two of the thrust producing units 3a, 3b, 3c, 3d can respectively be arranged at a front and rear section of the fuselage 2, and so on.

According to one aspect, at least one and, preferably, each one of the thrust producing units 3a, 3b, 3c, 3d is equipped with at least two rotor assemblies. By way of example, the thrust producing unit 3c is equipped with two rotor assemblies 7c, 8c, and the thrust producing unit 3d is equipped with two rotor assemblies 7d, 8d. The rotor assemblies 7c, 7d illustratively define a plurality of upper rotor assemblies 7 and the rotor assemblies 8d illustratively define a plurality of lower rotor assemblies 8.

Preferentially, the upper rotor assemblies, 7c, 7d are arranged above the lower rotor assemblies 8c, 8d such that the upper and lower rotor assemblies 7c, 8c; 7d, 8d are stacked, i.e. arranged on top of each other with congruent rotor axes 12. However, alternative configurations are likewise contemplated, such as e.g. axially displaced rotor axes.

More specifically, each one of the plurality of upper rotor assemblies 7 preferably defines a first rotor axis and each one of the plurality of lower rotor assemblies 8 preferably defines a second rotor axis. Preferentially, the first and second rotor axes are respectively congruent as explained above, i.e. coaxially arranged, so that the plurality of upper and lower rotor assemblies 7, 8 define a plurality of coaxially arranged rotor axes 12. Illustratively, the upper and lower rotor assemblies 7c, 8c define first and second congruent rotor axes, which are commonly referred to as the rotor axis 12c, and the upper and lower rotor assemblies 7d, 8d define first and second congruent rotor axes, which are commonly referred to as the rotor axis 12d. However, other configurations are likewise contemplated. E.g. the rotor axes can be arranged in parallel to each other, and so on.

The plurality of upper and lower rotor assemblies 7, 8 is preferably powered by an associated plurality of engines 5, which are preferentially embodied as electrical engines. Illustratively, the upper and lower rotor assemblies 7c, 8c are powered by an electrical engine 5c and the upper and lower rotor assemblies 7d, 8d are powered by an electrical engine 5d. However, it should be noted that the engines can respectively be implemented by any suitable engine that is capable of producing torque in operation, such as a turbine, diesel engine, Otto-motor, electrical engine and so on.

Preferably, at least one of the upper and lower rotor assemblies 7, 8 is accommodated inside of a respectively associated shrouding of the plurality of shroudings 6. Illustratively, the lower rotor assemblies 8c, 8d are accommodated inside of the shroudings 6c, 6d, respectively. The upper rotor assemblies 7c, 7d are exemplarily located outside of, and in FIG. 1 illustratively above, the shroudings 6c, 6a.

Figure 2:
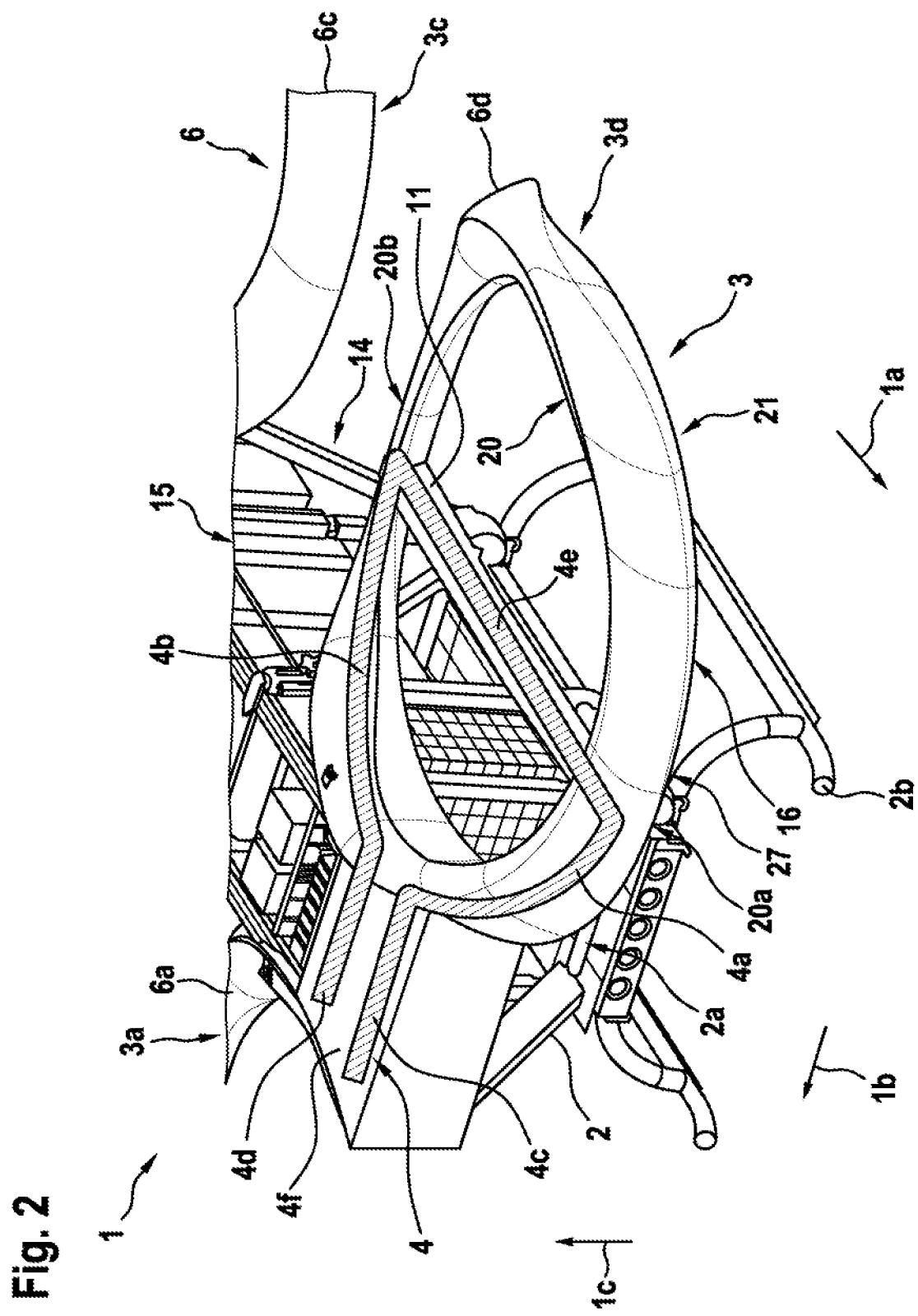
FIG. 2 shows a perspective view of a simplified portion of the multirotor aircraft of FIG. 1 illustrating an exemplary shrouding with constructional details.

FIG. 2 shows the multirotor aircraft 1 of FIG. 1 with the fuselage 2 that extends in the longitudinal direction 1a, the vertical direction 1c, and a lateral direction 1b. However, in contrast to FIG. 1, the fuselage 2 is merely shown as a truss structure 14 that is illustratively provided with an energy supply 15.

The intension of showing the fuselage 2 as the truss structure 14 is to simplify illustration of the inventive mounting and attachment of the thrust producing units 3 of FIG. 1 and, more specifically, of their shroudings 6 to the fuselage 2, as described hereinafter. However, it should be noted that only the thrust producing unit 3d with the shrouding 6d of FIG. 1 is illustrated in greater detail representative for all thrust producing units 3 and all shroudings 6 of the multirotor aircraft 1 of FIG. 1.

According to one aspect, the shrouding 6d of the thrust producing unit 3d defines a cylindrical air duct 20 and comprises a leading edge region 20a and a trailing edge region 20b. Only for clarity, it should be noted that the leading edge region 20a is the region at the edge of the shrouding 6d, i.e. the cylindrical air duct 20, that is arranged during forward flight of the multirotor aircraft 1 in the longitudinal direction 1a in an upstream position with respect to the trailing edge region 20b.

Figure 4:
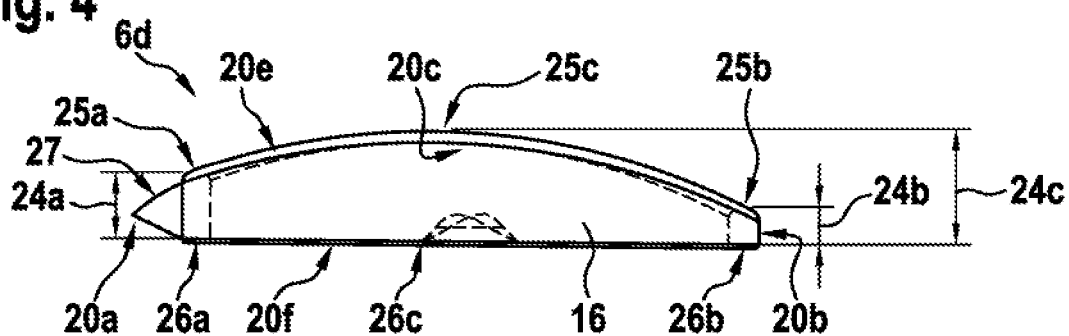
FIG. 4 shows a partly transparent side view of the shrouding of FIG. 2 and FIG. 3.

The cylindrical air duct 20 is axially delimited by an air inlet region (20e in FIG. 4) and an air outlet region (20f in FIG. 4). The leading edge region 20a is preferably provided with an additional lifting surface 27.

According to an aspect as illustrated in FIG. 2, the cylindrical air duct 20 of the shrouding 6a of the thrust producing unit 3d is provided in closed perimeter configuration. In other words, the shrouding 6d is provided in annular form.

Preferably, a carrier beam 4e is at least mounted at the leading edge region 20a of the cylindrical air duct 20 to the shrouding 6d. The carrier beam 4e is preferably at least essentially and, preferentially, completely arranged inside of the cylindrical air duct 20. According to the present invention, the carrier beam 4e is oriented at least essentially, i.e. within predetermined manufacturing tolerances, in parallel to the longitudinal direction 1a of the fuselage 2. As illustrated, the carrier beam 4e is preferably further mounted at the trailing edge region 20b of the cylindrical air duct 20 to the shrouding 6d.

According to one aspect, the carrier beam 4e is arranged eccentrically inside of the cylindrical air duct 20 and at least essentially, i.e. within predetermined manufacturing tolerances, coplanar to a cross section of the cylindrical air duct 20, seen in the vertical direction 1c of the fuselage 2. It should be noted that the eccentric arrangement of the carrier beam 4e is such that the carrier beam 4e preferably does not cross a rotation center resp. symmetry center of the cylindrical air duct 20.

Preferably, the carrier beam 4e is bar-shaped and extends from the leading edge region 20a to the trailing edge region 20b. According to one aspect, the carrier beam 4e implements an engine carrier 11 as explained in more detail below with reference to FIG. 3.

The carrier beam 4e is preferably connected to the fuselage 2. Thus, the shrouding 6d resp. the thrust producing unit 3d is structurally connected to the fuselage 2 according to one aspect. More generally, all shroudings 6 resp. all thrust producing units 3 of the mutt rotor aircraft 1 of FIG. 1 are preferably structurally connected in a similar manner to the fuselage 2 so that only the structural connection of the shrouding 6d resp. the thrust producing unit 3d to the fuselage 2 is explained in more detail hereinafter for purposes of conciseness and brevity.

According to one aspect, the shrouding 6d is configured with a supporting structure 16 that can be made of a simple pressed, bended metal sheet, or of a more or less complex structure and material, e.g. a fiber reinforced polymer structure. The supporting structure 16 preferably embodies an internal volume that can e.g. be used as storage volume, at least partially, for a battery system of the multirotor aircraft 1.

The supporting structure 16 preferentially encompasses at least partly a suitable structural support 4 that is provided for mounting the shrouding 6d resp. the thrust producing unit 3d to the fuselage 2. As the shrouding 6d resp. the thrust producing unit 3d is illustrated representative for all shroudings 6 resp. thrust producing units 3 as explained above, this means that each one of the shroudings 6 resp. thrust producing units 3 is preferably mounted to the fuselage 2 by means of an associated structural support that is embodied similar to the structural support 4.

The structural support 4 and, thus, the shrouding 6d preferably comprises a forward beam 4a and an aft beam 4b, as well as the carrier beam 4e. The forward beam 4a and the aft beam 4b preferentially connect the carrier beam 4e to the fuselage 2. The forward beam 4a and the aft beam 4b are preferably integrally formed with the carrier beam 4e or at least rigidly attached thereto.

According to one aspect, the forward beam 4a and the aft beam 4b are arranged outside of the cylindrical air duct 20. Preferably, the forward beam 4a and the aft beam 4b are arranged inside of the shrouding 6d, i.e. inside of the supporting structure 16.

Illustratively, the part of the shrouding 6d which is provided with the forward beam 4a and the aft beam 4b that are connected to the carrier beam 4e defines an inner portion of the cylindrical air duct 20 i.e. a portion that is adjacent to the fuselage 2. The remaining portion of the shrouding 6d is hereinafter referred to as an "outer half of duct" and labeled with the reference sign 21. This outer half of duct 21 advantageously provides additional lift in operation of the multirotor aircraft 1.

Preferably, the forward beam 4a comprises a forward flange 4c and the aft beam 4b comprises an aft flange 4d. The forward flange 4c and the aft flange 4d are preferentially rigidly mounted to the fuselage 2.

The forward beam 4a and the forward flange 4c are preferably integrally formed or at least rigidly mounted to each other. Similarly, the aft beam 4b and the aft flange 4d are preferably integrally formed or at least rigidly mounted to each other. Furthermore, the forward flange 4c and the aft flange 4d may be integrally formed or at least be rigidly mounted to each other.

According to one aspect, the forward flange 4c and the aft flange 4d are connected to an associated flange 4f of the fuselage 2. Preferably, the forward flange 4c and the aft flange 4d are rigidly but removably mounted to the flange 4f. The flange 4d may be integrally formed with the fuselage 2 or at least be rigidly mounted thereto.

The forward flange 4c and the aft flange 4d may be rigidly mounted to or integrally formed with a respective forward beam and aft beam associated with the shrouding 6a of the thrust producing unit 3a. However, the shrouding 6a may likewise be provided with separate forward and aft flanges that are similar to the forward and aft flanges 4c, 4d of the shrouding 6d of the thrust producing unit 3d and which are, in turn, mounted to the flange 4f of the fuselage 2.

A more specific exemplary realization of the shrouding 6d of the thrust producing unit 3d as such is described in core detail below with reference to FIG. 4 through FIG. 8.

Figure 3:
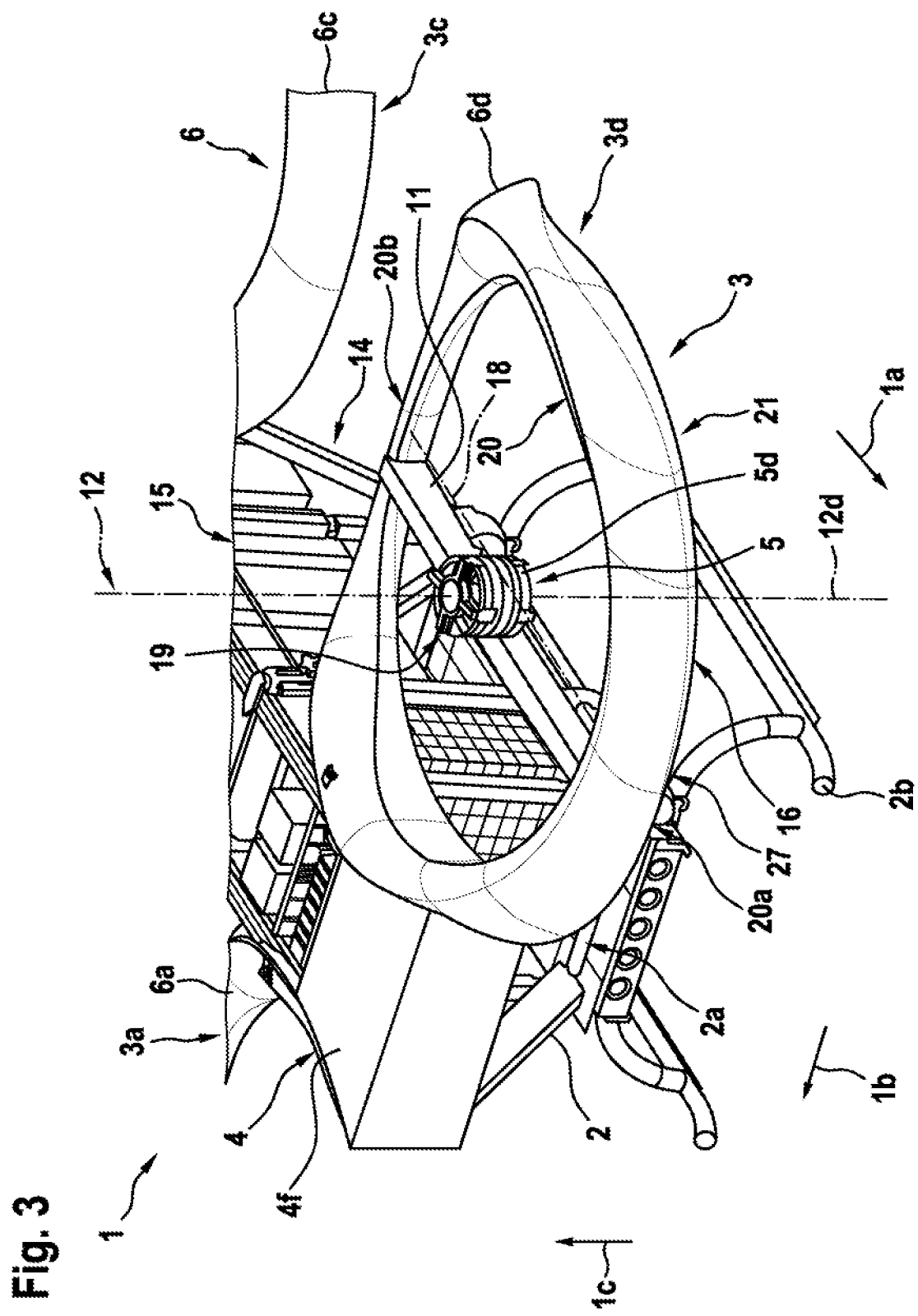
FIG. 3 shows a perspective view of a simplified portion of the multirotor aircraft of FIG. 1 illustrating the exemplary shrouding of FIG. 2 with an electrical engine.

FIG. 3 shows the multirotor aircraft 1 with the fuselage 2 of FIG. 1 and FIG. 2 with the shrouding 6d of the thrust producing unit 3d that is provided in closed perimeter configuration as described above with reference to FIG. 2. It should be noted that the thrust producing unit 3d with the shrouding 6d is again illustrated representative for all thrust producing units 3 resp. shroudings 6 and attached to the flange 4f of the fuselage 2, as described above with reference to FIG. 2. Furthermore, similar to the illustration in FIG. 2, the fuselage 2 is shown as the truss structure 14 that accommodates the energy supply 15.

According to one aspect, the shrouding 6d is provided with the engine carrier 11 that is embodied by the carrier beam 4e of FIG. 2. The at least one electrical engine 5d of FIG. 1 is preferably mounted to the carrier beam 4e resp. the engine carrier 11, as illustrated.

Preferably, the electrical engine 5d is eccentrically mounted to the carrier beam 4e resp. the engine carrier 11. More specifically, as explained above with reference to FIG. 2, the engine carrier 11 is mounted eccentrically inside of the cylindrical air duct 20 resp. the shrouding 6d. In other words, the engine carrier 11 is mounted to the shrouding 6d such that it is arranged in parallel to a center line resp. symmetry axis 18 that traverses the shrouding 6d from the leading edge region 20a to the trailing edge region 20b, but without crossing the rotation axis 12d of the electrical engine 5d. The center line 18, however, crosses the rotation axis 12d and is oriented in parallel to the longitudinal direction 1a of the fuselage 2, at least essentially.

It should be noted that the eccentrical mounting of the electrical engine 5d to the engine carrier 11 refers to a mounting of the electrical engine 5d to the engine carrier 11 such that the electrical engine 5d is only laterally in contact with the engine carrier 11, i.e. that a lateral position 19 of the electrical engine 5d is mounted to the engine carrier 11. In other words, only one side of the electrical engine 5d is in connection with the engine carrier 11. Accordingly, the electrical engine 5d has a periphery that is essentially available for cooling of the electrical engine 5d in operation.

FIG. 4 shows a schematic view of the shrouding 6d of the thrust producing unit 3d of FIG. 2 and FIG. 3, which defines the cylindrical air duct 20, for illustrating an aerodynamically improved configuration thereof according to one aspect of the present invention. Illustratively, the cylindrical air duct 20 is radially delimited by the supporting structure 16 of FIG. 2 and FIG. 3.

The cylindrical air duct 20 is preferably axially delimited by an air inlet region 20e and an air outlet region 20f. Outside of the cylindrical air duct 20 and preferably above as well as adjacent to the air inlet region 20e of the cylindrical air duct 20 is preferably arranged the first rotor assembly 7d of FIG. 1.

It should be noted that the air duct 20 is only by way of example designated as a "cylindrical" air duct and not for limiting the present invention accordingly. In other words, while a "cylindrical" shaping of the air duct implies equal radii all along the air duct 20 from the air inlet region 20e to the air outlet region 20f, alternative configurations are likewise contemplated. For instance, the air duct 20 may exhibit the form of a frustum, such that its radius is e.g. greater at the air outlet region 20f than at the air inlet region 20e, and so on. Therefore, is should be understood that the expression "cylindrical air duct" is meant to encompass also such alternative configurations of the air duct 20.

The air inlet region 20e preferably exhibits in circumferential direction of the cylindrical air duct 20 an undulated geometry. More specifically, this undulated geometry implies that when moving in circumferential direction of the cylindrical air duct 20 along the air inlet region 20e, an undulated motion resp. a wave-shaped movement is performed.

In operation of the thrust producing unit 3d, the air inlet region 20e preferably functions as an air collector and is, therefore, hereinafter also referred to as the "collector 20e" of the cylindrical air duct 20, for simplicity and clarity. The air outlet region 20f may, but not necessarily, be embodied and function as a diffusor and is therefore hereinafter also referred to as the "diffusor 20f" of the cylindrical air duct 20, for simplicity and clarity.

The cylindrical air duct 20 and, more particularly, the shrouding 6d, comprises the leading edge region 20a and the trailing edge region 20b of FIG. 2 and FIG. 3. Furthermore, the shrouding 6d, i.e. the cylindrical air duct 20, preferentially comprises a board side lateral region 20c and a star board side lateral region 20d that are located at the air inlet region 20e.

More specifically, the leading edge region 20a is diametrically opposed to the trailing edge region 20b in circumferential direction of the shrouding 6d, i.e. the cylindrical air duct 20, and the board side lateral region 20c is diametrically opposed to the star board side lateral region 20d. Furthermore, the board side lateral region 20c and the star board side lateral region 20d are respectively arranged between the leading edge region 20a and the trailing edge region 20b in circumferential direction of the shrouding 6d, i.e. the cylindrical air duct 20.

According to one aspect, the cylindrical air duct 20 has a height defined between the diffusor 20f and the collector 20e in axial, direction of the cylindrical air duct 20 that varies in circumferential direction of the cylindrical air duct 20. This varying height defines the undulated geometry of the collector 20e as described hereinafter.

More specifically, a height 24a at the leading edge region 20a is preferably smaller than a height 24c at the board side lateral region 20c and/or the star board side lateral region 20d. Furthermore, a height 24b at the trailing edge region 20b is preferably smaller than the height 24c at the board side lateral region 20c and/or the star board side lateral region 20d. Moreover, the height 24b at the trailing edge region 20b is preferably smaller than the height 24a at the leading edge region 20a. According to one aspect, the height 24c at the board side lateral region 20c and/or the star board side lateral region 20d is selected in a range from 0.05*D to 0.5*D, wherein D defines a diameter, preferably an inner diameter (20g in FIG. 6), of the cylindrical air duct 20.

According to one aspect, the collector 20e of the cylindrical air duct 20 has a radius that varies in the circumferential direction of the cylindrical air duct 20. In other words, the collector 20e is preferably not provided with a flat upper edge, i.e. its edge that points away from the diffusor 20f, but with a rounded upper edge. Preferentially, the radius of the collector 20e, which is hereinafter also referred to as the "collector radius" for simplicity and clarity, differs between at least two of the leading edge region 20a, the trailing edge region 20b, the board side lateral region 20c and the star board side lateral region 20d.

Preferably, a collector radius 25a at the leading edge region 20a is selected in a range from 0.01*D to 0.25*D, a collector radius 25b at the trailing edge region 20b is selected in a range from 0 to 0.25*D, and a collector radius 25c at the board side lateral region 20c and/or the star board side lateral region 20d is selected in a range from 0.01*D to 0.25*D. As already mentioned above, D defines the diameter, preferably the inner diameter (20g in FIG. 6), of the cylindrical air duct 20.

Likewise, the diffusor 20f of the cylindrical air duct 20 may have a radius that varies in the circumferential direction of the cylindrical air duct 20. In other words, the diffusor 20f is not necessarily provided as illustrated with a flat lower edge, i.e. its edge that points away from the collector 20e, but with a rounded lower edge. Preferentially, the radius of the diffusor 20f, which is hereinafter also referred to as the "diffusor radius" for simplicity and clarity, differs between at least two of the leading edge region 20a, the trailing edge region 20b, the board side lateral region 20c and the star board side lateral region 20d.

Preferably, a diffusor radius 26a at the leading edge region 20a is selected in a range from 0 to 0.1*D, a diffusor radius 26b at the trailing edge region 20b is selected in a range from 0 to 0.1*D, and a diffusor radius 26c at the board side lateral region 20c and/or the star board side lateral region 20d is selected in a range from 0 to 0.1*D. Again, as already mentioned above, D defines the diameter, preferably the inner diameter (20g in FIG. 6), of the cylindrical air duct 20.

Figure 5:
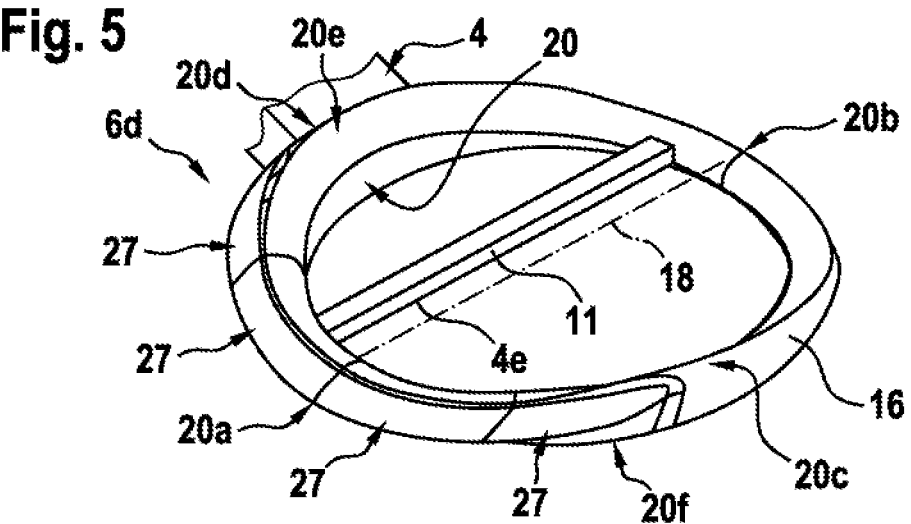
FIG. 5 shows a perspective view of the shrouding of FIG. 4 according to one aspect.

FIG. 5 shows the shrouding 6d of FIG. 4 that defines the cylindrical air duct 20, which is preferably axially delimited by the collector 20e and the diffusor 20f and which comprises the leading edge region 20a, the trailing edge region 20b, the board side lateral region 20c and the star board side lateral region 20d. The leading edge region 20a is provided with the additional lifting surface 27.

Figure 6:
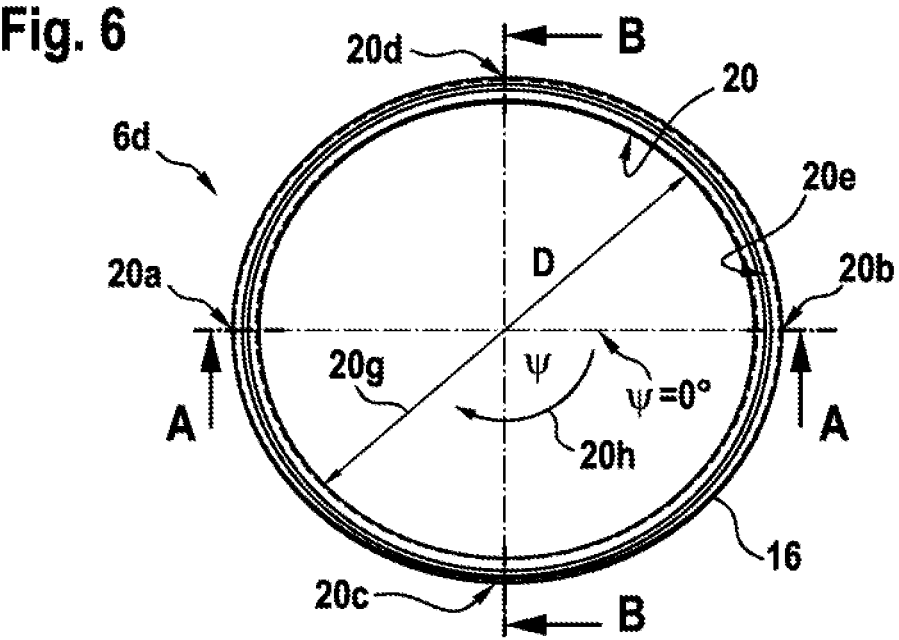
FIG. 6 shows c top view of the shrouding of FIG. 4 and FIG. 5.

FIG. 6 shows the shrouding 6d of FIG. 2 to FIG. 5 that defines the cylindrical air duct 20, which comprises the leading edge region 20a, the trailing edge region 20b, the board side lateral region 20c and the star board side lateral region 20d according to FIG. 4 and FIG. 5. Illustratively, a diameter and, more specifically, an inner diameter D of the cylindrical air duct 20 is labeled with the reference sign 20g. Furthermore, the azimuth ψ of the cylindrical air duct 20, i.e. the shrouding 6d, is labeled with the reference sign 20h. By way of example, it is assumed that the azimuth ψ is defined in clockwise direction of the shrouding 6d as illustrated and starts turning from the trailing edge region 20b such that ψ=0 at the trailing edge region 20b.

Figure 7:
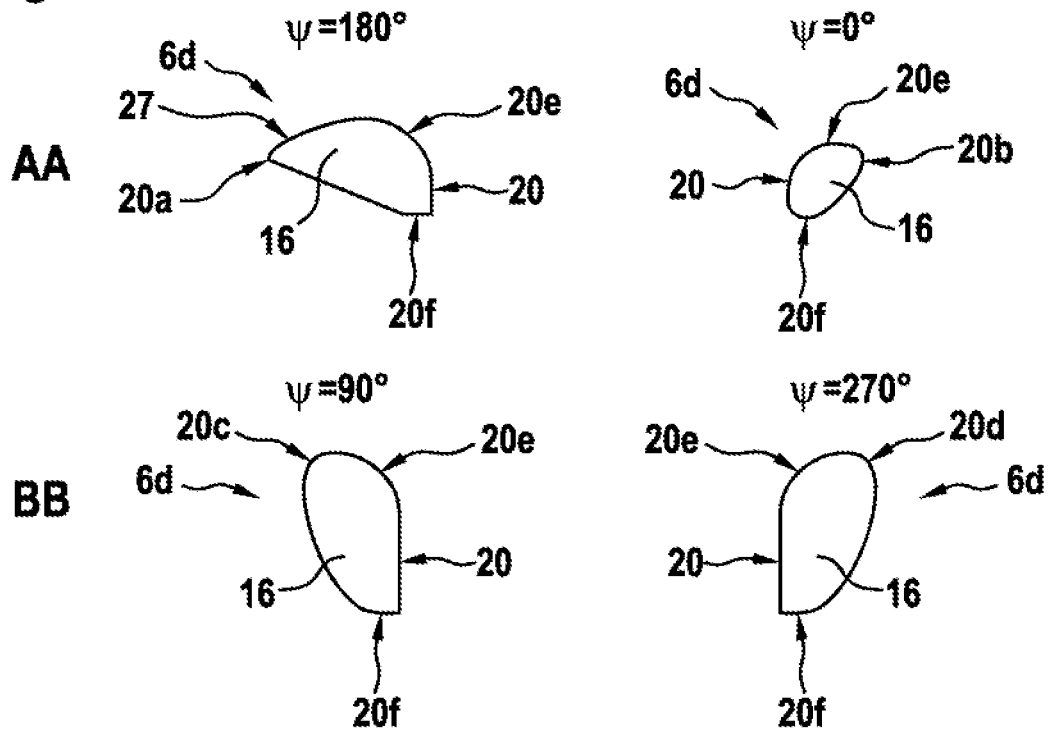
FIG. 7 shows exemplary cross-sections of the shrouding of FIG. 4 to FIG. 6.

FIG. 7 shows four exemplary cross-sections of the shrouding 6d of FIG. 4 to FIG. 6 that defines the cylindrical air duct 20, which is preferably axially delimited by the collector 20e and the diffusor 20f and which comprises the leading edge region 20a, the trailing edge region 20b, the board side lateral region 20c and the star board side lateral region 20d. Each cross-section corresponds to a sectional view of the shrouding fid at a given azimuth ψ of FIG. 6.

More specifically, a first sectional view illustrates an exemplary cross-section of the shrouding 6d at the azimuth ψ=180° seen in direction of the cut line A-A of FIG. 6. This first sectional view illustrates the leading edge region 20a of the shrouding 6d that is provided with the additional lifting surface 27. By way of example, the collector 20e is provided at the leading edge region 20a as described above with reference to FIG. 4 with a rounded upper edge, while the diffusor 20f is illustratively provided with a flat lower edge.

A second sectional view illustrates an exemplary cross-section of the shrouding 6d at the azimuth ψ=0° seen in direction of the cut line A-A of FIG. 6. This second sectional view illustrates the trailing edge region 20b of the shrouding 6d. By way of example and as described above with reference to FIG. 4, the collector 20e is provided at the trailing edge region 20b with a rounded upper edge and the diffusor 20f is provided with a rounded lower edge.

A third sectional view illustrates an exemplary cross-section of the shrouding 6d at the azimuth ψ=90° seen in direction of the cut line B-B of FIG. 6. This third sectional view illustrates the board side lateral region 20c of the shrouding 6d. By way of example, the collector 20e is provided at the board side lateral region 20c as described above with reference to FIG. 4 with a rounded upper edge, while the diffusor 20f is illustratively provided with a flat lower edge.

A fourth sectional view illustrates an exemplary cross-section of the shrouding 6d at the azimuth ψ=270° seen in direction of the cut line B-B of FIG. 6. This fourth sectional view illustrates the star board side lateral region 20d of the shrouding 6d. By way of example, the collector 20e is provided at the star board side lateral region 20d as described above with reference to FIG. 4 with a rounded upper edge, while the diffusor 20f is illustratively provided with a flat lower edge.

Figure 8:
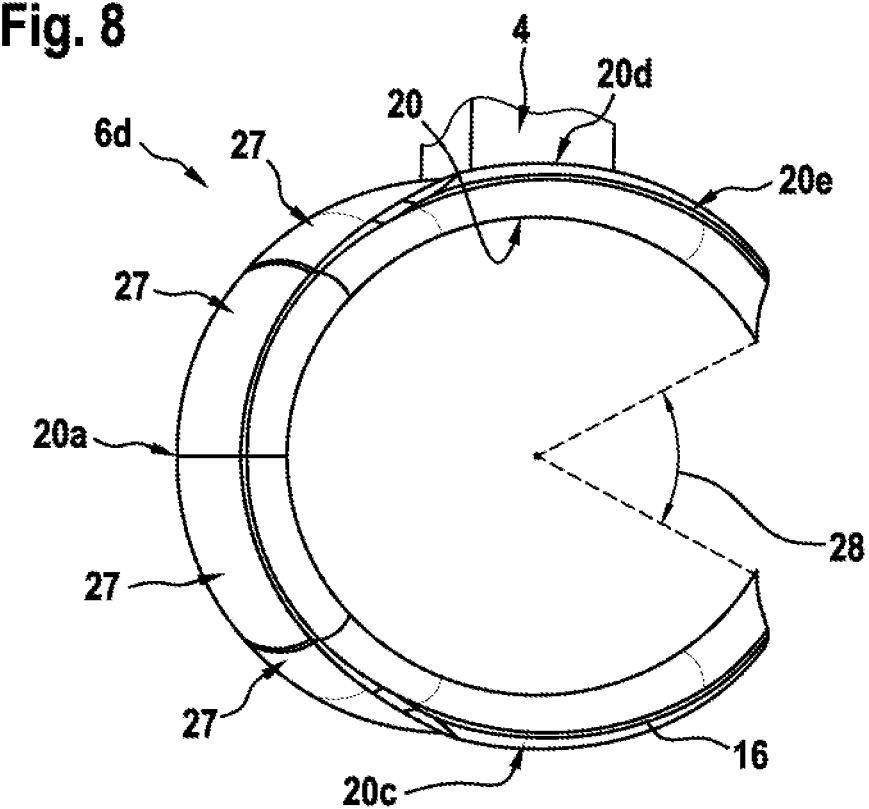
FIG. 8 shows a top view of the shrouding of FIG. 4 to FIG. 6 according to a first variant.

FIG. 8 shows the shrouding 6d of FIG. 4 to FIG. 7 that defines the cylindrical air duct 20, which comprises the leading edge region 20e, the trailing edge region 20b, the board side lateral region 20c and the star board side lateral region 20d. However, in contrast to the implementation of the shrouding 6d according to FIG. 4 to FIG. 7, the trailing edge region 20b of the cylindrical air duct 20 is now at least essentially open. Preferably, the cylindrical air duct 20 is open at the trailing edge region 20b over a predetermined opening angle 28 of e.g. 30° to 180°. In other words, the cylindrical air duct 20 is provided with a shrouding opening that is defined by the predetermined opening angle 28 and, therefore, hereinafter also referred to using the reference sign 28.

Figure 9:
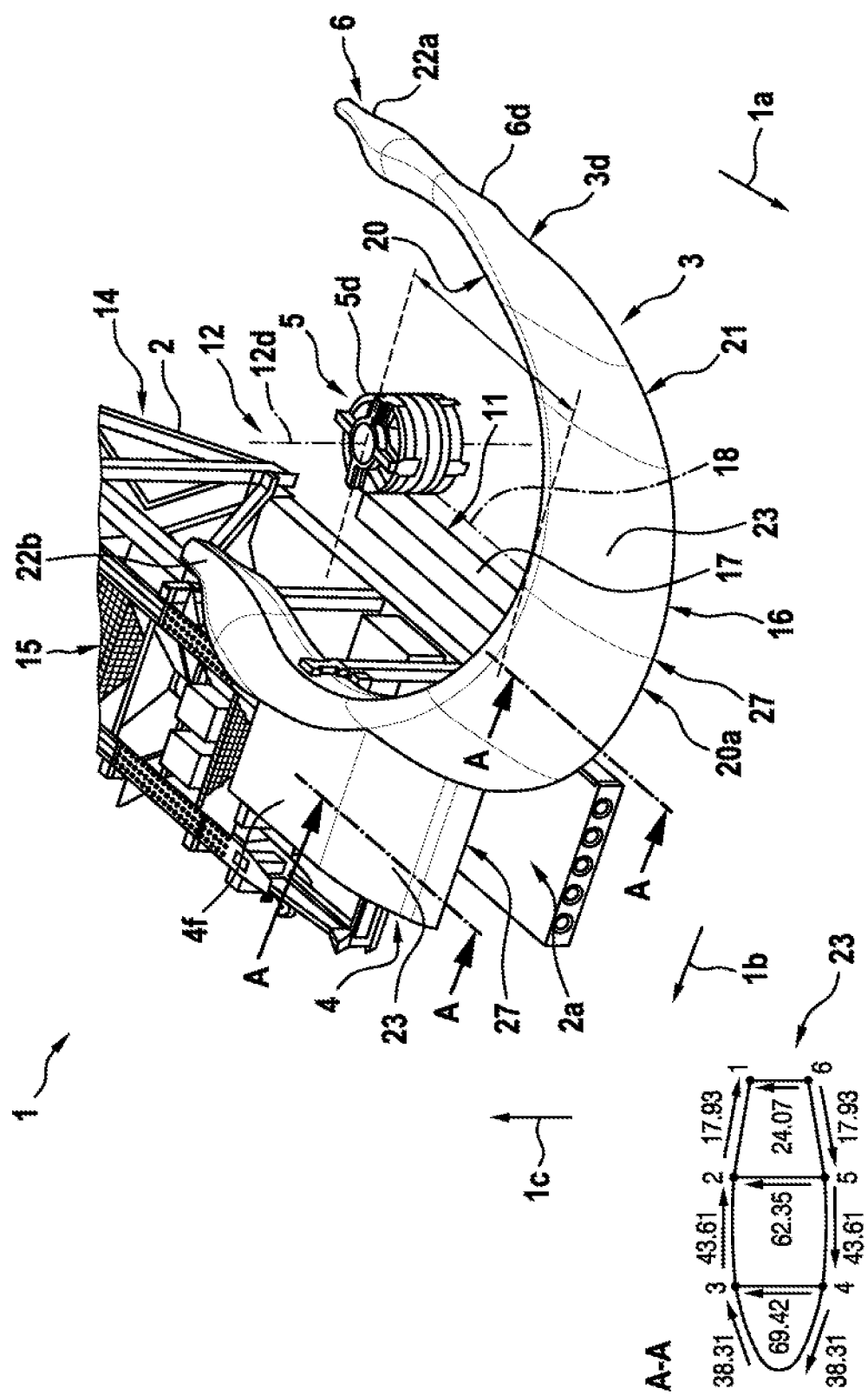
FIG. 9 shows a perspective view of a simplified portion of the multirotor aircraft of FIG. 1 with the exemplary shrouding of FIG. 8 according to the first variant, and with an electrical engine.

FIG. 9 shows the multirotor aircraft 1 with the fuselage 2 of FIG. 1 with the shrouding 6d of the thrust producing unit 3d that is, in contrast to FIG. 2 and FIG. 3, now provided in opened perimeter configuration. In the opened perimeter configuration, the shrouding 6d is at least partly cut-off at the trailing edge region. 20b of the cylindrical air duct 20 over the predetermined opening angle 28 of FIG. 8, as described above with reference to FIG. 8.

It should be noted that the opened perimeter configuration is advantageous with respect to the closed perimeter configuration described above with reference to FIG. 2 and FIG. 3, as it allows to further reduce the undesired aerodynamical drag on the shrouding 6d. In fact, a majority of the aerodynamical drag at the shrouding 6d according to FIG. 2 and FIG. 3 in closed perimeter configuration is created at the trailing edge region 20b of the cylindrical air duct 20. Thus, by cutting-off the trailing edge region 20b over the predetermined opening angle 28, the aerodynamical drag can be reduced significantly.

Illustratively, and only by way of example and not for limiting the present invention accordingly, the predetermined opening angle 28 amounts approximately up to 180°. In other words, in the illustrated example, the trailing edge region 20b of the shrouding 6d as shown in FIG. 1 to FIG. 3 is completely cut-off. Preferably, the trailing edge region 20b of the shrouding 6d as shown in FIG. 1 to FIG. 3 is replaced by two aerodynamically shaped longitudinal extensions 22a, 22b. The latter are exemplarily embodied as lateral continuations of the star board side lateral region 20d and the board side lateral region 20c, respectively, of FIG. 4.

According to one aspect, the thrust producing unit 3d resp. the shrouding 6d is again provided with the engine carrier 11. However, in contrast to FIG. 2 and FIG. 3, the engine carrier 11 is no more implemented by means of the carrier beam 4e of FIG. 2 and FIG. 3, which is mounted at the leading edge region 20a and the trailing edge region 20b of the cylindrical air duct 20 to the shrouding 6d, as the trailing edge region 20b is cut-off. Instead, the carrier beam 4e is replaced by a cantilever 17, which is only mounted at the leading edge region 20a of the cylindrical air duct 20 to the shrouding 6d and which now embodies the engine carrier 11.

Accordingly, the at least one electrical engine 5d of FIG. 1 is now preferably mounted to the cantilever 17 resp. the engine carrier 11, as illustrated. Preferentially, the electrical engine 5d is eccentrically mounted to the cantilever 17 resp. the engine carrier 11 of the thrust producing unit 3d.

It should be noted that the thrust producing unit 3d with the shrouding 6d is again illustrated representative for all thrust producing units 3 resp. shroudings 6 and attached to the flange 4f of the fuselage 2, as described above with reference to FIG. 2. Furthermore, similar to the illustration in FIG. 2, the fuselage 2 is shown as the truss structure 14 that accommodates the energy supply 15.

Moreover, it should be noted that the shrouding 6d and, more particularly, the leading edge region 20a of the shrouding 6d as well as a front portion of the flange 4f of the fuselage 2 resp. the structural support 4 is now prone to comparatively high bending forces, which could no more be compensated by means of the trailing edge region 20b. In fact, as the trailing edge region 20b is cut-off, load transfer from the at least one electrical engine 5d via the support structure 4 and, more particularly, at least in part via the aft beam 4b and the aft flange 4d of FIG. 2 is no more possible in the opened perimeter configuration. Thus, another compensation means is required in order to guarantee a reliable and secure operation of the thrust producing unit 3d.

As a consequence, according to one aspect the shrouding 6d is not only provided with the additional lifting surface 27 at its leading edge region 20a, but also with a torque box 23 that is configured to support even higher bending forces. A cut view along a cut line A-A shows an exemplary implementation resp. aerodynamic profile of the torque box 23, which is preferably implemented wing-like.

Advantageously, the flange 4f at the fuselage 2 respectively the structural support 4 that is mounted to the flange 4f at the fuselage 2 may also be provided with the torque box 23. In other words, the torque box 23 extends from the shrouding 6d to the structural support 4 so that an even better bending force compensation may be achieved by enlarging the torque box 23 further.

Figure 10:
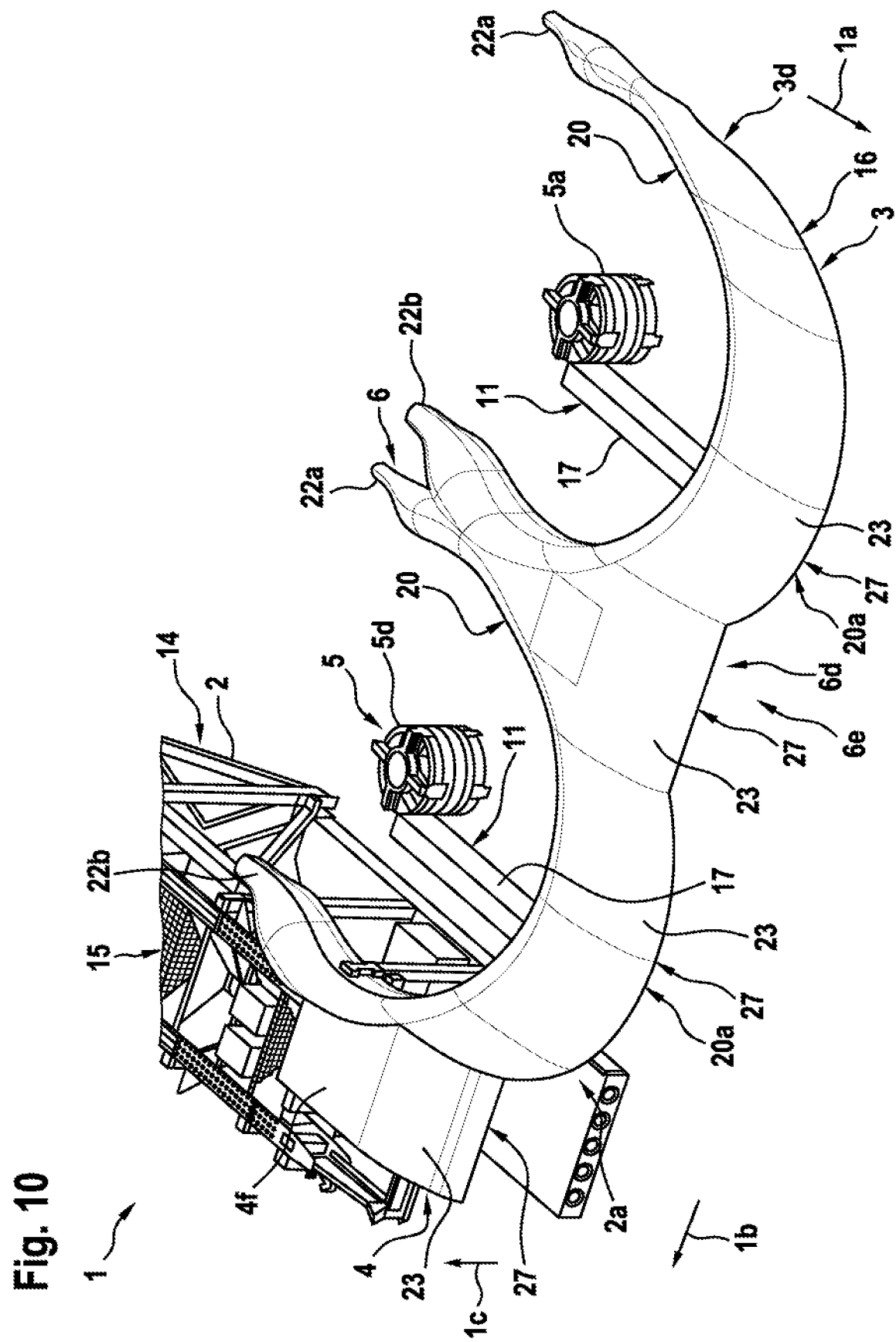
FIG. 10 shows a perspective view of a simplified portion of the multirotor aircraft of FIG. 1 with an exemplary double shrouding according to a second variant, and with two electrical engines.

FIG. 10 shows the multirotor aircraft 1 with the fuselage 2 that is only illustratively implemented by means of the truss structure 14 and that comprises the shrouding 6d of the thrust producing unit 3d of FIG. 9, which is provided in opened perimeter configuration. However, in contrast to FIG. 9, the thrust producing unit 3d is now provided as an interconnected, double thrust producing unit, i.e. as a cascaded thrust producing unit having exemplarily two interconnected resp. cascaded shroudings that now form the shrouding 6d. More specifically, the shrouding 6d now exhibits in top view an E-shaped form, while in FIG. 9 the shrouding 5d exhibits in top view a C-shaped form.

In fact, according to one aspect the cascaded E-shaped shrouding 6d of FIG. 10 merely consists of two single cascaded C-shaped shroudings 6d according to FIG. 9, which are interconnected by means of a suitable interconnection area 6e, such that they are arranged laterally with respect to each other.

Preferably, the leading edge regions 20a of both laterally arranged resp. cascaded shroudings that form the shrouding 6d and the interconnection area 6e, as well as the structural support 4 that is mounted to the flange 4f of the fuselage 2, are now embodying the torque box 23 of FIG. 9. Furthermore, each one of the C-shaped shroudings that form the E-shaped cascaded shrouding 6d is now provided with an associated engine carrying cantilever 17 that is connected to an associated one of the electrical engines 5.

However, it should be noted that although the shrouding 6d according to FIG. 10 only shows two laterally arranged resp. cascaded shrouding's that form the shrouding 6d and that define the thrust producing unit 3d, more than two laterally arranged shroudings that form the shrouding 6d are likewise contemplated. Furthermore, it should again be noted that the shrouding 6d is merely represented by way of example and representative for all shroudings 6 of FIG. 1.

Finally, it should be noted that modifications of the above described aspects of the present invention are also within the common knowledge of the person skilled in the art and, thus, also considered as being part of the present invention. By way of example, the thrust producing units 3a and 3d of FIG. 1 may be implemented as cascaded thrust producing units with E-shaped shroudings as described with reference to FIG. 10, while the thrust producing units 3b, 3c of FIG. 1 may be embodied as single C-shaped shroudings as explained above with reference to FIG. 9. Furthermore, it should be noted that also the thrust producing units having shroudings in closed perimeter configuration as described above with reference to FIG. 2 and FIG. 3 may be embodied as cascaded thrust producing units, wherein two or more laterally arranged shroudings according to FIG. 10 are implemented. In other words, FIG. 10 may be realized by using shroudings in closed perimeter configuration instead of using shroudings in opened perimeter configuration. Finally, it should also be noted that on a single multirotor aircraft, such as the multirotor aircraft 1 of FIG. 1, a mix of shroudings in closed perimeter configuration and open perimeter configuration may be used. Also, in a configuration such as illustrated in FIG. 10, wherein cascaded shroudings are used, one or more of the shroudings may be implemented in opened perimeter configuration while one or more other shroudings are implemented in closed perimeter configuration. For instance, in a thrust producing unit with three shroudings, a middle shrouding may be embodied in opened perimeter configuration while both outer shroudings are embodied in closed perimeter configuration, and vice versa.

REFERENCE LIST

1 Multirotor aircraft
1a Aircraft longitudinal, direction and forward flight direction
1b Aircraft lateral direction
1c Aircraft vertical direction
2 Aircraft airframe
2a Aircraft airframe internal volume
2b Undercarriage
3 Thrust producing units
3a, 3b, 3c, 3d Thrust producing unit
4 Thrust producing units structural support
4a Forward beam
4b Aft beam
4c Forward flange
4d Aft flange
4e Engine carrier beam
4f Flange
5 Engines
5a, 5c, 5d Electrical engine
6 Shrouding units
6a, 6c, 6d Shrouding
6e Shrouding interconnection area
7 Upper rotor assemblies
7c, 7d Upper rotor assembly
8 Lower rotor assemblies
8c, 8d Lower rotor assembly
9 Thrust producing airstream direction
9a Thrust vector
10 Ground
11 Engine carrier
12 Rotor axes
12c, 12d Rotor axis
13 Outer shell
14 Truss structure
15 Energy supply
16 Supporting structure
17 Engine carrier cantilever
18 Center line from leading edge to trailing edge
19 Lateral position
20 Air duct
20a Leading edge region
20b Trailing edge region 20c Board side lateral region
20d Star board side lateral region
20e Collector
20f Diffusor
20g Air duct inner diameter (B)
20h Air duct azimuth (ψ)
21 Outer half of duct
22a, 22b Longitudinal extensions
23 Torque box
24a Total height of air duct leading edge (HL)
24b Total height of air duct trailing edge (HT)
24c Total height of air duct lateral region (HS)
25a Collector radius at air duct leading edge (CRL)
25b Collector radius at air duct trailing edge (CRT)
25c Collector radius at air duct lateral region (CRS)
26a Diffusor radius at air duct leading edge (DRL)
26b Diffusor radius at air duct trailing edge (DRT)
26c Diffusor radios at air duct lateral region (DRS)
27 Additional lifting surface
28 Shrouding opening and opening angle

What is claimed is:

1. A multirotor aircraft with an airframe that extends in a longitudinal direction, and with at least one thrust producing unit for producing thrust in a predetermined thrust direction, wherein the at least one thrust producing unit comprises a shrouding that is associated with at least one rotor assembly comprising at least one electrical engine, wherein the shrouding defines a cylindrical air duct that is axially delimited by an air inlet region and an air outlet region, wherein a carrier beam is at least mounted at a leading edge region of the cylindrical air duct to the shrouding such that the carrier beam is arranged inside of the cylindrical air duct and oriented at least essentially in parallel to the longitudinal direction, wherein the shrouding comprises a forward beam and an aft beam which both connect the carrier beam to the airframe, the forward beam and the aft beam being arranged outside of the cylindrical air duct, wherein the forward beam comprises a forward flange, and wherein the aft beam comprises an aft flange, the forward flange and the aft flange being attached to the airframe, and wherein the at least one electrical engine is mounted to the carrier beam.

2. The multirotor aircraft of claim 1,
wherein the carrier beam is arranged eccentrically inside of the cylindrical air duct and at least essentially coplanar to a cross section of the cylindrical air duct.

3. The multirotor aircraft of claim 1,
wherein the carrier beam is a cantilever.

4. The multirotor aircraft of claim 1,
wherein the carrier beam is further mounted at a trailing edge region of the cylindrical air duct to the shrouding.

5. The multirotor aircraft of claim 4,
wherein the carrier beam is bar-shaped and extends from the leading edge region to the trailing edge region.

6. The multirotor aircraft of claim 1,
wherein the forward beam and the forward flange are integrally formed, wherein the aft beam and the aft flange are integrally formed, and/or wherein the forward flange and the aft flange are integrally formed.

7. The multirotor aircraft of claim 1,
wherein the cylindrical air duct is provided in closed perimeter configuration or in opened perimeter configuration, the shrouding being at least partly cut-off in the opened perimeter configuration at a trailing edge region of the cylindrical air duct over a predetermined opening angle.

8. The multirotor aircraft of claim 1,
wherein the shrouding is provided with an additional lifting surface at the leading edge region of the cylindrical air duct.

9. The multirotor aircraft of claim 1,
wherein the at least one electrical engine is eccentrically mounted to the carrier beam.

10. The multirotor aircraft of claim 1,
wherein the air inlet region exhibits in circumferential direction of the cylindrical air duct an undulated geometry, wherein the cylindrical air duct comprises in circumferential direction the leading edge region and a diametrically opposed trailing edge region, a board side lateral region and a diametrically opposed star board side lateral region, wherein the board side lateral region and the star board side lateral region are respectively arranged in the circumferential direction of the cylindrical air duct between the leading edge region and the trailing edge region, and wherein a height at the leading edge region is smaller than a height at the board side lateral region and/or the star board side lateral region.

11. The multirotor aircraft of claim 10,
wherein the cylindrical air duct exhibits a height defined between the air outlet region and the air inlet region in axial direction of the cylindrical air duct that varies in circumferential direction of the cylindrical air duct, wherein the height that varies in the circumferential direction of the cylindrical air duct defines the undulated geometry of the air inlet region.

12. The multirotor aircraft of claim 10,
wherein the height at the trailing edge region is smaller than a height at the board side lateral region and/or the star board side lateral region.

13. The multirotor aircraft of claim 10,
wherein the height at the trailing edge region is smaller than the height at the leading edge region.

14. A multirotor aircraft comprising:
an airframe extending in a longitudinal direction; and
at least one thrust producing unit for producing thrust in a predetermined thrust direction;
the at least one thrust producing unit comprising:
   at least one rotor assembly comprising at least one electrical engine;
   a shrouding associated with the at least one rotor assembly, the shrouding comprising a wall defining a cylindrical air duct axially delimited by an air inlet region and an air outlet region,
   a carrier beam mounted at a leading edge region of the cylindrical air duct to the shrouding such that the carrier beam is arranged inside of the cylindrical air duct and oriented essentially parallel to the longitudinal direction, and
   a forward beam and an aft beam, the forward and aft beams connecting the carrier beam to the airframe, the forward beam and the aft beam arranged outside of the cylindrical air duct, wherein the forward beam comprises a forward flange, and wherein the aft beam comprises an aft flange, the forward flange and the aft flange being attached to the airframe,
wherein the at least one electrical engine is mounted to the carrier beam.

15. The multirotor aircraft of claim 14,
wherein the carrier beam is arranged eccentrically inside of the cylindrical air duct and at least essentially coplanar to a cross section of the cylindrical air duct.

16. The multirotor aircraft of claim 14,
wherein the at least one electrical engine is eccentrically mounted to the carrier beam.

17. The multirotor aircraft of claim 14,
wherein the air inlet region exhibits in circumferential direction of the cylindrical air duct an undulated geometry.

18. The multirotor aircraft of claim 17,
wherein the cylindrical air duct exhibits a height defined between the air outlet region and the air inlet region in axial direction of the cylindrical air duct that varies in circumferential direction of the cylindrical air duct, wherein the height that varies in the circumferential direction of the cylindrical air duct defines the undulated geometry of the air inlet region.

19. The multirotor aircraft of claim 14,
wherein the air inlet region exhibits in circumferential direction of the cylindrical air duct an undulated geometry, wherein the cylindrical air duct comprises in circumferential direction the leading edge region and a diametrically opposed trailing edge region, a board side lateral region and a diametrically opposed star board side lateral region, wherein the board side lateral region and the star board side lateral region are respectively arranged in the circumferential direction of the cylindrical air duct between the leading edge region and the trailing edge region, and wherein a height at the leading edge region is smaller than a height at the leading edge region.

20. The multirotor aircraft of claim 14,
wherein the carrier beam is bar-shaped and extends from the leading edge region to the trailing edge region.

\* \* \* \* \*